(12) United States Patent
Titley et al.

(10) Patent No.: US 8,813,013 B2
(45) Date of Patent: Aug. 19, 2014

(54) PARTITIONING DESIGNS TO FACILITATE CERTIFICATION

(71) Applicant: Altera Corporation, San Jose, CA (US)

(72) Inventors: Adam Titley, Bracknell (GB); David Samuel Goldman, Washington, DC (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/866,624

(22) Filed: Apr. 19, 2013

(65) Prior Publication Data

US 2014/0189622 A1    Jul. 3, 2014

Related U.S. Application Data

(63) Continuation-in-part of application No. 13/656,361, filed on Oct. 19, 2012, now Pat. No. 8,635,571.

(51) Int. Cl.
*G06F 17/50* (2006.01)

(52) U.S. Cl.
USPC .......................................... 716/117; 716/118

(58) Field of Classification Search
USPC ................................. 716/116–120
See application file for complete search history.

(56) References Cited

U.S. PATENT DOCUMENTS

| | | | |
|---|---|---|---|
| 8,407,645 B1 * | 3/2013 | Caranci et al. | 716/126 |
| 2001/0047503 A1 * | 11/2001 | Zhang | 714/784 |
| 2010/0218146 A1 * | 8/2010 | Platzker et al. | 716/4 |
| 2011/0145778 A1 | 6/2011 | Chen | |

* cited by examiner

*Primary Examiner* — Binh Tat

(74) *Attorney, Agent, or Firm* — Weaver Austin Villeneuve & Sampson LLP

(57) ABSTRACT

This disclosure relates generally to field-programmable gate arrays (FPGAs). Some implementations relate to methods and systems for partitioning FPGA circuit designs to facilitate certification. In one aspect, a method includes generating a hardware description language (HDL) implementation of a circuit design. The method additionally includes partitioning the design into a first portion and a second portion. In some implementations, the second portion corresponds to a safety-critical portion of the design while the first portion corresponds to a non-safety-critical portion. The method additionally includes generating first configuration settings for the first portion and generating second configuration settings for the second portion. The method additionally includes verifying, or providing to a third-party certification body for verification, the first configuration settings for the first portion and the second configuration settings for the second portion. The method further includes providing the configuration settings for the second portion for programming into a PLD.

17 Claims, 8 Drawing Sheets

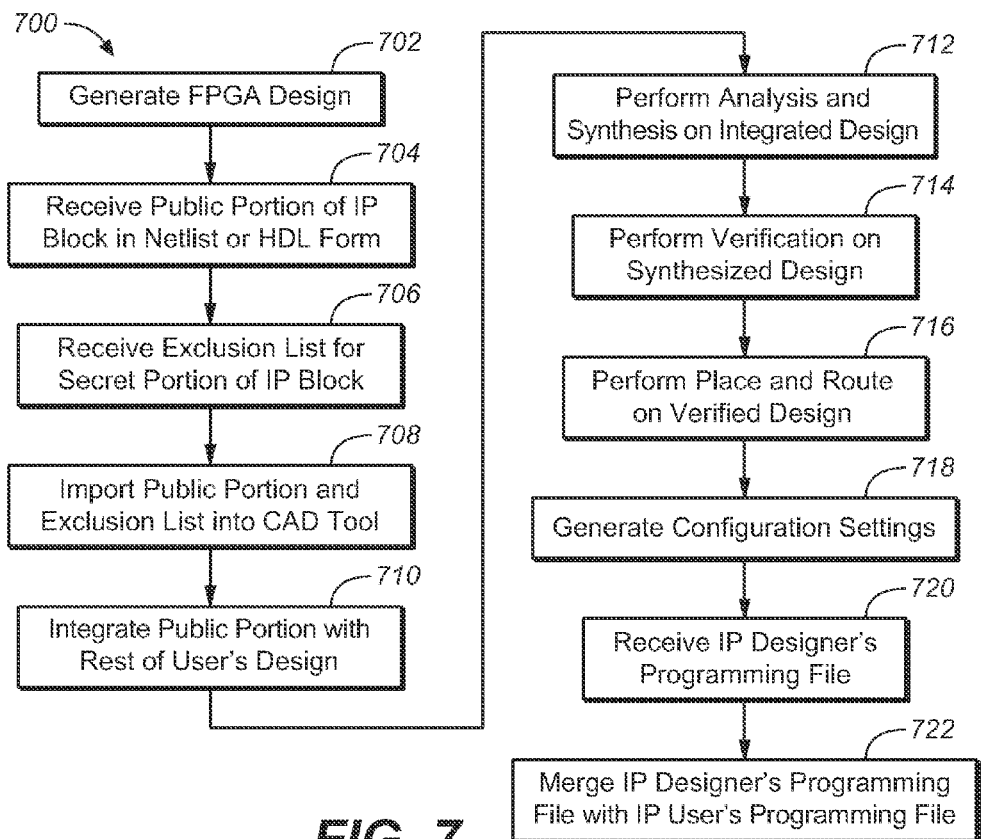

PARTITIONING DESIGNS TO FACILITATE CERTIFICATION

CROSS-REFERENCE TO RELATED APPLICATION

This application is a continuation-in-part and claims priority and benefit, under 35 U.S.C. §120, of co-pending U.S. patent application Ser. No. 13/656,361, filed Oct. 19, 2012 and titled "INTEGRATING MULTIPLE FPGA DESIGNS BY MERGING CONFIGURATION SETTINGS", which is hereby incorporated by reference in its entirety for all purposes.

FIELD OF THE INVENTION

This disclosure relates generally to field-programmable gate arrays (FPGAs), and more specifically, to methods and systems for partitioning FPGA circuit designs to facilitate certification

BACKGROUND

In many modern applications, FPGA circuit developers design only a portion of an entire FPGA design. For example, one FPGA circuit developer can design a processor core, another FPGA developer can design a memory block, another can design a memory controller, and still others can design other portions of the FPGA design. The various circuit developers may work for a single entity as part of different teams or for different entities (e.g., for different circuit developers in different business enterprises). Because of, for example, the difficulty and expense of designing and verifying a circuit design, and the commerciability of the design, a designing entity may desire to keep the circuit design a secret, or at least desire not to disclose, or limit the disclosure of, the circuit design to other parties such as other developers, users, designers, or customers. A semiconductor intellectual property core, or simply "IP core" or "IP block," can refer to a unit of logic, a cell, a chip layout, or otherwise to a circuit design to be used in conjunction with other circuits as part of a larger FPGA circuit design. The IP block is the design of, and typically intellectual property of, a particular circuit developer. The IP developer (or "designer") may sell or license use of the IP block to another developer or user that then implements the IP block into that user's own larger design, which may itself be a part of a larger design.

Although IP blocks can be sent to other parties, such as a user of an FPGA, as a netlist, IP blocks are typically sent at the register-transfer-level (RTL) level, such as in the form of a synthesizable hardware description language (HDL)-implemented design. Because the design is delivered in an HDL form, the user can modify the design at the functional level. However, as described above, because a developer may wish to keep the design secret (e.g., as a trade secret), because of the time and expense involved with verification, or for other reasons, a developer may not want the user to be able to have such access to the functional description of the circuit design. For example, because a circuit developer may not offer a warranty or support for the IP block if the design is modified, the circuit developer may desire to prevent an FPGA user from having access to the functional description of the circuit design. Providing the circuit design to the user as a software netlist can provide better protection against reverse engineering than providing the design in an HDL form, but reverse engineering can still be accomplished. The IP developer may also simply desire to ensure that the end user or customer receives the benefit of the verified implementation for the developer's own goodwill. Additionally, some IP developers are required to have their IP blocks independently verified by a third party such as a certification body (such as TÜV Rheinland headquarted in Cologne, Germany) to ensure a product integrating the design will meet functional safety requirements. For example, a certification body may certify that the IP block meets the Functional Safety of Electrical/Electronic/Programmable Electronic Safety-related Systems specification—IEC 61508—an international standard of rules applied in industry. This can be a significantly costly and often time-consuming procedure.

SUMMARY

This disclosure relates generally to programmable logic devices (PLDs) such as field-programmable gate arrays (FPGAs). Some implementations relate to methods and systems for partitioning FPGA circuit designs to facilitate certification. In one aspect of the subject matter disclosed, a method includes generating a hardware description language (HDL) implementation of a circuit design to be implemented on a programmable logic device (PLD) device. The method additionally includes partitioning the circuit design into a first portion and a second portion, the first portion including an interface for coupling the first portion and the second portion. The method additionally includes generating first configuration settings for the first portion based on the HDL implementation and generating second configuration settings for the second portion based on the HDL implementation. The method additionally includes verifying, or providing to a third-party certification body for verification, the first configuration settings for the first portion and the second configuration settings for the second portion. The method further includes providing the configuration settings for the second portion for programming into a PLD.

In some implementations, the method further includes revising the first portion, generating revised first configuration settings for the revised first portion, and merging the revised first configuration settings for the revised first portion with the second configuration settings for the second portion. In some such implementations, providing the configuration settings for the second portion for programming into the PLD comprises providing the merged configuration settings for both the revised first portion and the second portion for programming into the PLD. In some implementations, the second portion is a safety-critical portion that includes functions that require certification as meeting functional safety requirements.

In some implementations, the method further includes analyzing the HDL implementation to generate a hierarchical implementation of the circuit design, wherein partitioning the circuit design into the first portion and the second portion is performed at the hierarchical representation level. In some implementations, the method further includes generating an exclusion list of resources to be reserved for the second portion. In some implementations, the configuration settings for the second portion are generated in the form of programming bits and wherein the programming bits for the second portion are included as part of a first programming file. In some implementations, the configuration settings for the revised first portion are generated in the form of programming bits and wherein the programming bits for the revised first portion are included as part of a second programming file. In some implementations, the method further includes generating a bit mask that includes a first set of bits each having a first logical value and a second set of bits each having a second logical value, each of the first set of bits being in a location of the bitmask that corresponds to a programming bit in the first or second programming file that is used by the second portion. In some such implementations, merging the revised first configuration settings for the revised first portion with the second configuration settings for the second portion comprises merging the first programming file with the second programming file using the bitmask to generate a merged programming file. For example, in some implementations, when a CAD tool operates on the first programming file with the bitmask, the tool is enabled to extract the programming bits for the second portion from the first programming file. In some implementations, the method further includes using the bitmask to verify that the programming bits for the second portion have not been altered in the merged programming file.

In another aspect, a programmable logic device (PLD) is disclosed that is formed by a process that includes generating a hardware description language (HDL) implementation of a circuit design to be implemented on a programmable logic device (PLD) device. The process additionally includes partitioning the circuit design into a first portion and a second portion, the first portion including an interface for coupling the first portion and the second portion. The process additionally includes generating first configuration settings for the first portion based on the HDL implementation and generating second configuration settings for the second portion based on the HDL implementation. The process additionally includes verifying, or providing to a third-party certification body for verification, the first configuration settings for the first portion and the second configuration settings for the second portion. The process further includes providing the configuration settings for the second portion for programming into a PLD.

In some implementations, the process further includes revising the first portion, generating revised first configuration settings for the revised first portion, and merging the revised first configuration settings for the revised first portion with the second configuration settings for the second portion. In some such implementations, providing the configuration settings for the second portion for programming into the PLD comprises providing the merged configuration settings for both the revised first portion and the second portion for programming into the PLD. In some such implementations, the second portion is a safety-critical portion that includes functions that require certification as meeting functional safety requirements.

In some implementations, the process further includes analyzing the HDL implementation to generate a hierarchical implementation of the circuit design, wherein partitioning the circuit design into the first portion and the second portion is performed at the hierarchical representation level. In some implementations, the process further includes generating an exclusion list of resources to be reserved for the second portion. In some implementations, the configuration settings for the second portion are generated in the form of programming bits and wherein the programming bits for the second portion are included as part of a first programming file. In some implementations, the configuration settings for the revised first portion are generated in the form of programming bits and wherein the programming bits for the revised first portion are included as part of a second programming file. In some implementations, the process further includes generating a bit mask that includes a first set of bits each having a first logical value and a second set of bits each having a second logical value, each of the first set of bits being in a location of the bitmask that corresponds to a programming bit in the first or second programming file that is used by the second portion. In some such implementations, merging the revised first configuration settings for the revised first portion with the second configuration settings for the second portion comprises merging the first programming file with the second programming file using the bitmask to generate a merged programming file. In some implementations, the process further includes using the bitmask to verify that the programming bits for the second portion have not been altered in the merged programming file.

In another aspect, a method is disclosed that includes generating a hardware description language (HDL) implementation of a circuit design to be implemented on a programmable logic device (PLD) device. The method includes partitioning the circuit design into a first portion and a second portion, the first portion including an interface for coupling the first portion and the second portion. The method additionally includes generating a netlist representation of the second portion. The method further includes verifying the second portion. After verifying the second portion, the method includes revising the first portion. The method then includes generating a netlist representation of the revised first portion. The method additionally includes merging the netlist representation of the previously verified second portion with the netlist representation of the revised first portion.

In some implementations, the second portion is a safety-critical portion that includes functions that require certification as meeting functional safety requirements. In some implementations, the method further includes analyzing the HDL implementation to generate a hierarchical implementation of the circuit design, wherein partitioning the circuit design into the first portion and the second portion is performed at the hierarchical representation level. In some implementations, the method further includes generating a programming file including configuration settings for both the revised first portion and the second portion. In some such implementations, the method further includes generating a bit mask that includes a first set of bits each having a first logical value and a second set of bits each having a second logical value, each of the first set of bits being in a location of the bitmask that corresponds to a programming bit in the programming file that is used by the second portion. In some such implementations, the method additionally includes using the bitmask to verify that the programming bits for the second portion have not been altered in the programming file.

These and other aspects are described further below with reference to the drawings.

BRIEF DESCRIPTION OF THE DRAWINGS

FIG. 7 shows a flowchart illustrating an example process for integrating an IP block into an IP user's design.

FIG. 8A shows an example portion of the IP user's programming file in which the bits that are to be used by the secret portion are identified with a default value.

FIG. 8B shows a merged programming file (or portion thereof) that results from the bitwise application of the result of FIG. 6B with the portion of the IP user's programming file of FIG. 8A.

DETAILED DESCRIPTION

Figure 1:
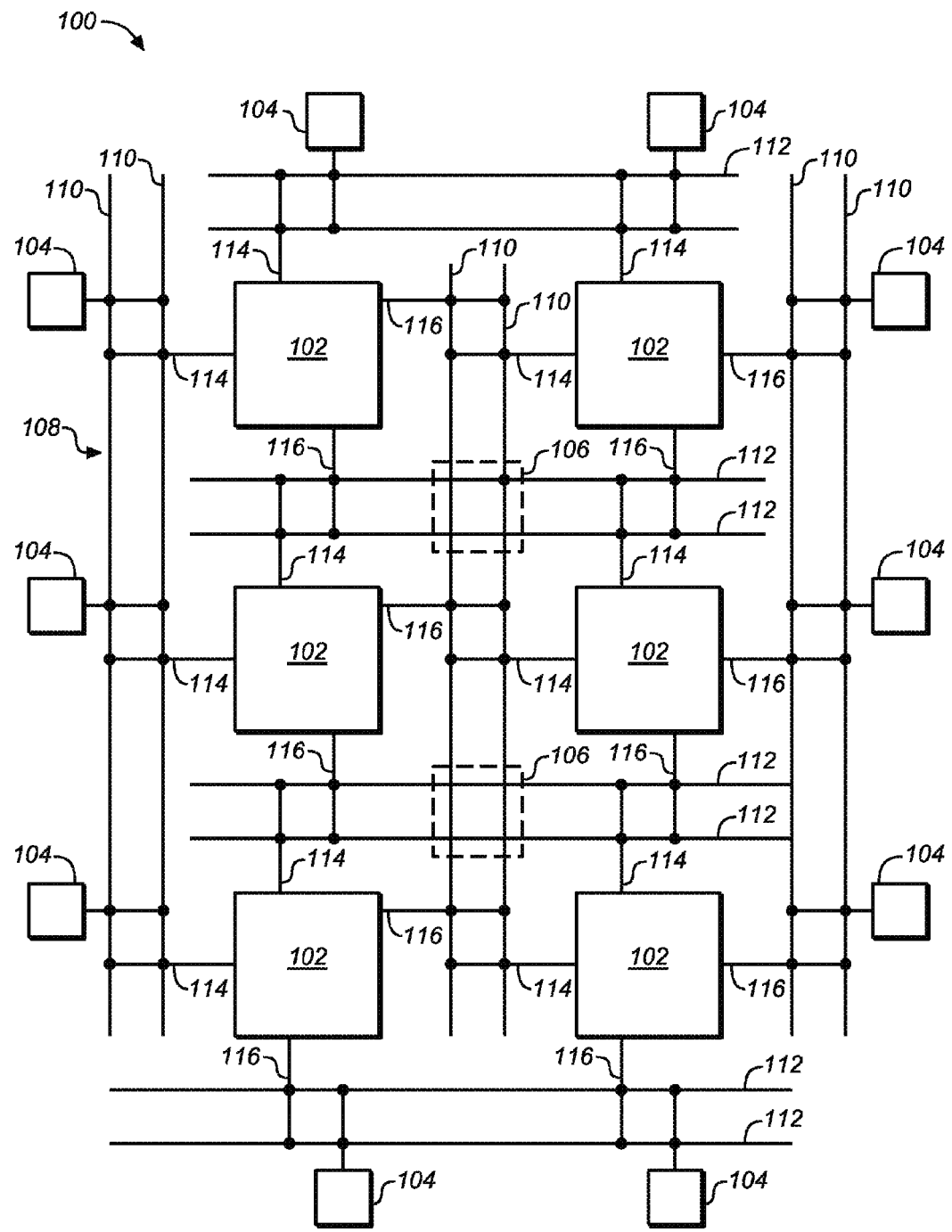
FIG. 1 shows an example implementation of an FPGA architecture.

In the following description, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments.

This disclosure relates generally to programmable logic devices (PLDs) such as field-programmable gate arrays (FPGAs), and more specifically, to methods and systems for partitioning, transmitting, and integrating FPGA circuit designs. For example, some implementations relate to methods and systems for partitioning, transmitting, and integrating one or more intellectual property (IP) blocks with one or more other IP blocks of another user's design. Particular implementations enable an IP block developer to send or otherwise provide an IP block to another IP designer, an IP user, or a customer (hereinafter collectively referred to as "users") without disclosing the functional description of a secret portion of the IP block and additionally ensuring that the secret portion is implemented on the PLD in an identical manner. In some implementations, the term "user" may refer to a party that is integrating one or more IP blocks or circuit designs into a final circuit design to be configured or programmed into a physical FPGA device. In some implementations, the IP developer designs the IP block to include both a secret portion and a public portion. In some implementations, the IP developer provides the public portion to an IP user at the register-transfer-level (RTL) level, as a hardware description language (HDL)-implemented design, or as a synthesizable netlist. In some implementations, a user can then receive the, for example, HDL-implemented representation of the public portion of the IP block, and integrate the public portion with the user's own design. The user can then generate a programming file based on the integrated HDL design that contains the configuration settings or "programming bits" to implement the user's design, including the public portion of the IP block, in a physical FPGA device.

In some implementations, the IP developer provides the secret portion of the IP block to the user in the form of programming bits without providing an HDL, RTL, or netlist implementation of the secret portion. The programming bits for the secret portion can be provided to the IP user in the form of a bitstream which may be part of an entire programming file. In some implementations in which the programming bits for the secret portion are provided as part of an entire programming file including bits for an entire physical FPGA device, the user merges the programming bits for the secret portion from the IP developer's programming file with the IP user's programming file using a bitmask generated by the IP developer and also provided to the IP user. The merged programming file can then by loaded into a memory for programming into a physical FPGA device. In some other implementations, such as in implementations useful for partially-reconfigurable FPGA devices, a bitstream containing the programming bits for the secret portion can be programmed into the FPGA device after the rest of the FPGA design has been programmed to the FPGA device. In some such implementations, the rest of the circuit design already programmed into the FPGA device can be operational while the bitstream containing the programming bits for the secret portion are programmed into the FPGA device.

Additionally or alternatively, in some implementations, an IP block may include functions or design portions that require functional safety certification with a certification body as well as functions that do not require such certification. As described above, in some cases, after such a design is certified as compliant with the functional safety requirements, an IP designer or user may seek to change some functions or portions of the design that do not require functional safety certification. However, as is also described above, conventional techniques require that all portions of the IP block be re-certified. However, by utilizing particular implementations, an IP developer can design the IP block to include both a safety-critical portion (a portion requiring certification of functional safety requirements by a certification body) as well as a non-safety-critical portion (a portion not requiring such certification). In some implementations, the developer provides at least the safety-critical portion of the design to a third-party certification body (such as TÜV Rheinland) in the form of CRAM programming bits. The programming bits for the safety-critical portion can be provided to the third-party certification body for verification and certification in the form of a bitstream, which may be part of an entire programming file. With the correct design and partitioning of the safety-critical portion from the non-safety-critical portion, the developer or a downstream user can make changes to the non-safety-critical portion of the design while ensuring that the CRAM programming bits for the safety-critical portion remain unchanged—and still entitled to certification by the certification body as meeting the functional safety requirements of the certification body—despite having to re-synthesize and regenerate the programming bits for the non-safety-critical portion.

With the increased use and complexity of digital circuits, circuit developers have used hardware description languages to design digital logic descriptions and other aspects of digital circuits at a high level. Generally, a hardware description language (HDL) is a computer specification or modeling language that can be used to describe a circuit's operation, its design and organization, and tests to verify its operation by means of simulation. Examples of HDLs include Verilog (IEEE 1364), VHDL (VHSIC hardware description language), Abel (Advanced Boolean Expression Language), and Altera HDL (AHDL). The HDL enables a circuit developer to specify the functionality of a circuit at a high level without requiring the developer to specify a particular electronic technology and physical layout. Typically, the developer uses the HDL to specify a data flow model of the circuit with timing information. For example, a developer can specify his design using hard-coded logic such as HDL text-based expressions of the spatial and temporal structure and behavior of the circuit or system. This level of abstraction implemented with the HDL can be referred to as the register-transfer-level (RTL). The RTL design abstraction models a circuit design as a synchronous digital circuit in terms of digital signals (e.g., data) between, for example, hardware registers, as well as the logical operations performed on those signals by combinational logic.

An HDL-implemented design can be created using a computer-aided design (CAD) tool. For example, electronic design automation (EDA), also known as electronic CAD (ECAD), refers to software tools (e.g., CAD tools) for designing electronic systems including integrated circuits such as application specific integrated circuit (ASIC) gate arrays as well as programmable logic devices (PLDs) such as field-programmable gate arrays (FPGAs). Using such a CAD tool configured with an HDL, a developer can write or otherwise specify a circuit design. The developer can specify some or all of the design using HDL code, as described above. A developer also can use a high level synthesis language to generate a portion of the HDL-implemented design. For example, such high level synthesis abstraction languages include LabVIEW FPGA from National Instruments Corp., CoreFire Design Suite from Annapolis Micro Systems, Inc., SystemVerilog, Handel-C, and SystemC, among others. A developer or user also can import some or all of a design already specified in an HDL and build on or otherwise modify the imported design using a CAD tool.

When a developer completes a design in HDL, the CAD tool then performs an analysis (e.g., a code review or auditing) in preparation for synthesis. During the analysis, the HDL-implemented design is subject to a variety of error checking operations to aid in resolving errors before the HDL-implemented design is synthesized. In some implementations, the CAD tool can generate a hierarchical representation of the design based on the analysis that includes modules and calls between modules. Using an HDL design, a logic synthesizing tool, which can be incorporated into or integrated with the CAD tool used to design the HDL (and which is hereinafter also referred to generally as a CAD tool), then synthesizes the HDL-implemented design into a design implementation in terms of, for example, logic circuits and logic gates. In some instances, the result of the logic synthesis is a physically-realizable gate netlist. The netlist is generally a Boolean-algebra representation of the function of the circuit design implemented as logic gates or process-specific standard cells. In contrast to HDLs, netlist languages generally express only the circuit connectivity between a hierarchy of blocks or logic elements. That is, while HDLs can be used to express structural, behavioral, or RTL architectures that include temporal characteristics, netlist languages do not specify temporal characteristics. The netlist can then be output and, in some instances, provided to another party (e.g., an IP user) in the form of, for example, a "simulation" or "hand-off" netlist, or as a generic industry-standard EDIF (Electronic Design Interchange Format).

CAD tools used to design PLDs can generate binary programming files including bitstreams that contain programming bits for configuring the PLDs. An FPGA is one such type of PLD designed to be configured for use by a user after the physical FPGA device is manufactured. FPGAs contain programmable logic blocks and reconfigurable interconnects that allow the programmable logic blocks to be interconnected in different configurations. FIG. 1 shows an example implementation of a representative portion of an example FPGA architecture 100 (also referred to herein as FPGA device 100). The FPGA architecture 100 includes an array of configurable logic blocks (CLBs) 102, also known as logic array blocks (LABs), as well as configurable input/output (I/O) pads 104, switches 106, and a routing architecture or "fabric" 108. For example, the routing architecture 108 can include multiple vertically-oriented lines or channels 110 and multiple horizontal lines or channels 112 that connect the logic blocks 102 and I/O pads 104. Each logic block 102 generally includes one or more inputs 114 and one or more outputs 116. Various FPGA logic blocks 102 can be configured to perform as simple logic gates (e.g., AND gates, NAND gates, OR gates, NOR gates, and XOR gates, among others), to perform as logic circuits (e.g., multiplexers and arithmetic logic units (ALUs), among others), to perform complex combinational functions, to perform as memory elements (e.g., latches, flip-flops, and registers, or even entire blocks of memory), memory controllers, as well as to perform as complete microprocessors or processor cores. Although six logic blocks 102 are shown for purposes of explanation in FIG. 1, generally, an FPGA 100 or other PLD can include tens, hundreds, thousands, or more logic blocks 102 arranged in, for example, a two-dimensional array interconnected by the routing architecture 108. Particular implementations described in this disclosure are not limited to any particular type of FPGA or FPGA hardware layout (e.g., the layout of the logic blocks, routing architecture, and I/O pads). Some implementations may be suitable for other types of PLDs as well.

Figure 2:
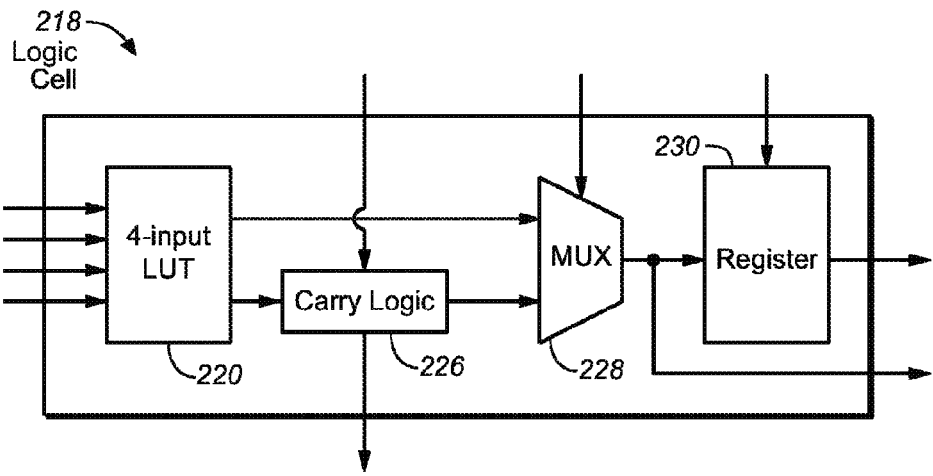
FIG. 2 shows an example implementation of a logic cell.

A typical FPGA logic block 102 includes one or more logic cells 218, also referred to as logic elements. FIG. 2 shows an example implementation of a logic cell 218. In some implementations, each logic cell 218 includes a look-up table (LUT) 220. For example, in some FPGA devices, each logic cell 218 includes a 4-input LUT 220. In some other implementations, each LUT 220 has 7 inputs, or another number of inputs. In some implementations, each LUT 220 is actually implemented as two or more lower input LUTs. For example, a 4-input LUT can be implemented as two interconnected 3-input LUTs.

Figure 3:
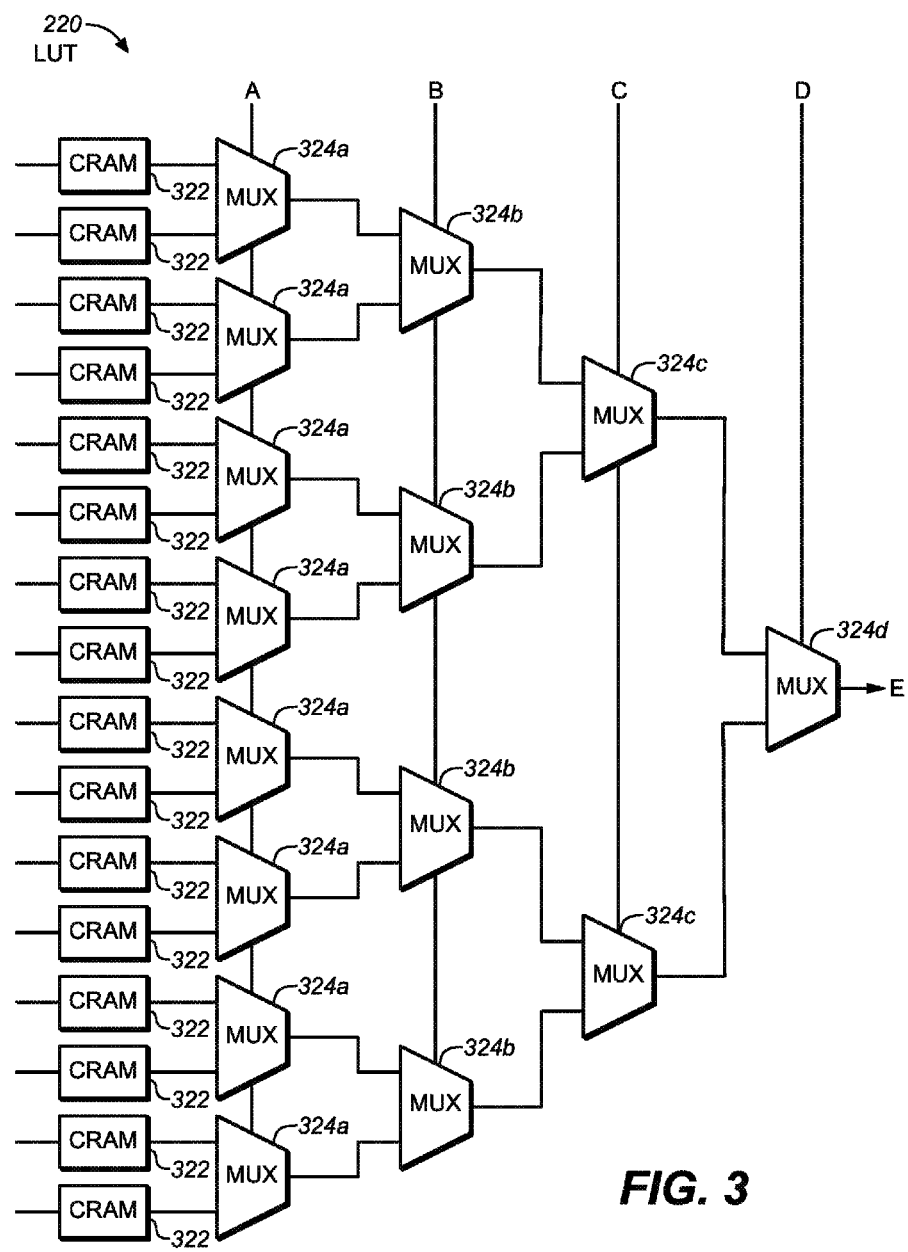
FIG. 3 shows an example 4-input LUT.

Many FPGAs are based on static random-access memory (SRAM). Typically, $2^n$ SRAM cells and corresponding bits are used to implement an n-input LUT—a LUT that maps "n" inputs or input functions to a single output. Thus, to implement a 4-input LUT, 16 SRAM programming bits can typically be required. The SRAM cells are often referred to as the configuration RAMs or "CRAMS." The programming bits programmed into the CRAMs (e.g., on power-up or during partial reconfiguration) to implement a circuit design such as an IP block are also referred to as the "configuration settings." In some implementations, each LUT 220 can be implemented as a $2^n$:1 multiplexer (or "MUX") where each CRAM provides the input to a corresponding input of the multiplexer. In some such implementations, a $2^n$:1 multiplexer can be implemented as $2^n-1$ individual 2:1 multiplexers. FIG. 3 shows an example 4-input LUT 220. The 4-input LUT includes 16 CRAMs 322 each providing an input to a 2:1 multiplexer of a first stage of multiplexers 324a. The outputs of the first stage of multiplexers 324a are the inputs to a second stage of multiplexers 324b. The outputs of the second stage of multiplexers 324b are the inputs to a third stage of multiplexers 324c. Finally, the outputs of the third stage of multiplexers 324c are the inputs to the fourth stage multiplexer 324d, which has a single output E. Each of the multiplexers of a given stage of multiplexers is controlled by a corresponding one of the inputs to the LUT 220. For example, the first stage multiplexers 324a are controlled by the first input A, the second stage multiplexers 324b are controlled by the second input B, the third stage multiplexers 324c are controlled by the third input C, and the fourth stage multiplexer 324d is controlled by the fourth input D. Based on the input signals A, B, C, and D, the set of multiplexers selects a bit to drive the output E. The bits in the CRAMs 322 dictate which logical operation or function is to be performed by the LUT 220. Each LUT 220 can generally implement any logical operation that can be specified with the number of inputs to the LUT. Thus, an n-input LUT can generally implement any logical function that can be specified with n or fewer binary inputs.

Other CRAMs 322 control or dictate the configuration of the switches 106 and the routing architecture 108 including the routing between logic blocks 102 and the routing between various other inputs and outputs (including between logic cells 208) and between the logic blocks 102 and the I/O pads 104. To program the functionality of the circuit design or designs into the FPGA device 100—that is, to configure the logic blocks 102, the I/O pads 104, the switches 106, and the routing architecture 108 needed by the circuit design—a user's CAD tool typically generates a programming file that includes the programming bits required for all of the IP blocks and other circuit designs of an entire FPGA design. The programming file can also include default values for the CRAMs in the physical FPGA device that are not used in the implemented FPGA design. The programming file also can generally include one or more commands or instructions. In some implementations or applications, the FPGA device 100 is connected to a circuit board. In some process flows, a programming tool transfers the programming file to a non-volatile memory, such as a Flash memory or EEPROM, on the same board as the FPGA 100. Upon power-up or based on an instruction, the FPGA 100 enters a programming or "configuration" mode or state (as opposed to an off state or a normal operating state). For example, upon the board powering up, some other logic, such as a controller, on the board with the FPGA 100 can cause the FPGA 100 to enter the configuration mode. When in the configuration mode, the FPGA 100 expects that some of its pins—its programming pins—are going to receive bits in a CRAM programming operation. The logic that caused the FPGA to enter the configuration mode, or some other logic on the board, such as a controller or memory controller, then retrieves the programming bits from the non-volatile memory and provides the retrieved programming bits to the FPGA 100. Logic within the FPGA 100 then programs the bits into the appropriate CRAMs 322 to configure the logic blocks 102 (e.g., the LUTs 210), the I/O pads 104, the switches 106, and the routing architecture 108 that forms the fabric interconnecting the logic blocks as well as the logic cells 218 within the logic blocks or other components of the FPGA design.

As shown in the example of FIG. 2, each logic cell 218 also can include one or more other elements such as, for example, carry logic (e.g., a full adder (FA)) 226, a multiplexer 228, and a register (e.g., a flip-flop such as a D flip-flop) 230. Register 220 may receive a clock signal from a global clock tree (not shown) of the FPGA 100. The register may receive the output signal E of the LUT 220 and output the signal E based on the clock signal. In some implementations, the FPGA 100 can include different types of logic cells 208. For example, various logic cells 208 can include LUTs 210 having various numbers of inputs. Other logic cells 208 also can include other hard-wired components such as multiplexers, demultiplexers, and registers. In some implementations, the FPGA 100 also can include an embedded processor and one or more memory blocks. As described above, many FPGAs are static RAM (SRAM)-based. SRAM-based FPGAs are volatile and thus the SRAM cells generally need to be configured upon every power-up. That is, each time the FPGA is powered on, some logic retrieves the programming bits from a memory (e.g., FLASH memory) also on the board and provides the programming bits to the FPGA. Logic within the FPGA then programs the bits into the appropriate CRAMs 322. Other types of FPGAs include SRAM-based FPGAs with integrated Flash, Flash-based FPGAs, and Antifuse-based FPGAs. Some FPGAs are configured as a system on a chip (SOC). For example, some SOC FPGAs produced by Altera Corporation integrate an embedded processor. For example, some Altera SOC FPGAs included an integrated hard processor system (HPS). Such an HPS can include a processor, peripherals, and memory interfaces using a high-bandwidth interconnect backbone.

In many modern applications, FPGA circuit developers design only a portion of an entire FPGA design. For example, one FPGA circuit developer can design a processor core, another FPGA developer can design a memory block, and still others can design other portions of the FPGA design. The various circuit developers may work for a single entity as part of different teams or for different entities (e.g., for different circuit developers in different business enterprises). At least in part due to the difficulty and expense of designing and verifying a circuit design, and the commerciability of the design, a designing entity may desire to keep the circuit design a secret, or at least desire not to disclose, or limit the disclosure of, the circuit design to other parties such as other developers, users, designers, or customers. A semiconductor intellectual property core, or simply "IP core" or "IP block," as used herein, refers generally to a circuit design for a PLD such as an FPGA. Generally, the IP block will constitute only a portion of a larger FPGA design. In various implementations, an IP block is designed to implement certain functions or functionality and may be designed to be integrated with another IP block or blocks of other users' designs and thus to work in conjunction with one or more IP blocks or other portions of a larger FPGA design. Each IP block can be implemented in one or more logic blocks 102 and typically includes a plurality of logic cells 218. Additionally, in some FPGA implementations, each logic block 102 can implement some or all of one or more IP blocks. The IP block is the design of, and typically intellectual property of, a particular circuit developer. The developer may sell or license use of the IP block to another developer or user that then implements the IP block into that user's own larger design, which may itself be a part of a larger design.

Although IP blocks can be sent to other parties, such as a user of an FPGA, as a netlist, IP blocks are typically sent at the register-transfer-level (RTL) level, such as in the form of a synthesizable hardware description language (HDL)-implemented design. Because the design is delivered in an HDL form, the user can modify the design at the functional level. However, as described above, because a developer may wish to keep the design secret (e.g., as a trade secret), because of the time and expense involved with verification, or for other reasons, a developer may not want the user to be able to have such access to the functional description of the circuit design.

For example, because a circuit developer may not offer a warranty or support for the IP block if the design is modified, the circuit developer may desire to prevent an FPGA user from having access to the functional description of the circuit design. Providing the circuit design to the user as a software netlist can provide better protection against reverse engineering than providing the design in an HDL form, but reverse engineering can still be accomplished. The IP developer may also simply desire to ensure that the end user or customer receives the benefit of the verified implementation for the developer's own goodwill or to meet functional safety requirements.

Some IP developers are required to have their IP blocks independently verified by a third party such as a certification body (such as TÜV Rheinland headquarted in Cologne, Germany) to ensure a product integrating the design will meet functional safety requirements. For example, a certification body may certify that the IP block meets the Functional Safety of Electrical/Electronic/Programmable Electronic Safety-related Systems specification—IEC 61508:2010—an international standard of rules applied in industry. This can be a significantly costly procedure. An IP developer may seek to prevent a second IP user from modifying the IP block so that verification of compliance with functional safety requirements isn't required twice. Additionally, either or both of the IP developer and the IP user may seek to ensure that a verified IP block design is provided to the IP user as it was synthesized and verified and, in the functional safety market, as it was certified by a certification body. Because an IP user's CAD tool may synthesize, place, or route an HDL-implemented design differently than the IP developer's synthesis tool or the third-party-verifier's tool, an IP user cannot be guaranteed to generate the exact programming bits at the CRAM-level as the IP developer generated. For at least this reason, an IP user may desire the exact programming bits (at the CRAM bit level) that were generated by the IP developer because the design as implemented by the IP developer-generated programming bits has already been verified. Additionally, an IP block may include functions that require functional safety certification with a certification body as well as functions that do not require such certification. In some cases, after such a design is certified as compliant with the functional safety requirements, an IP developer or user may seek to change some functions or portions of the design that do not require functional safety certification. However, conventional techniques require that all portions of the IP block be re-certified.

Figure 4:
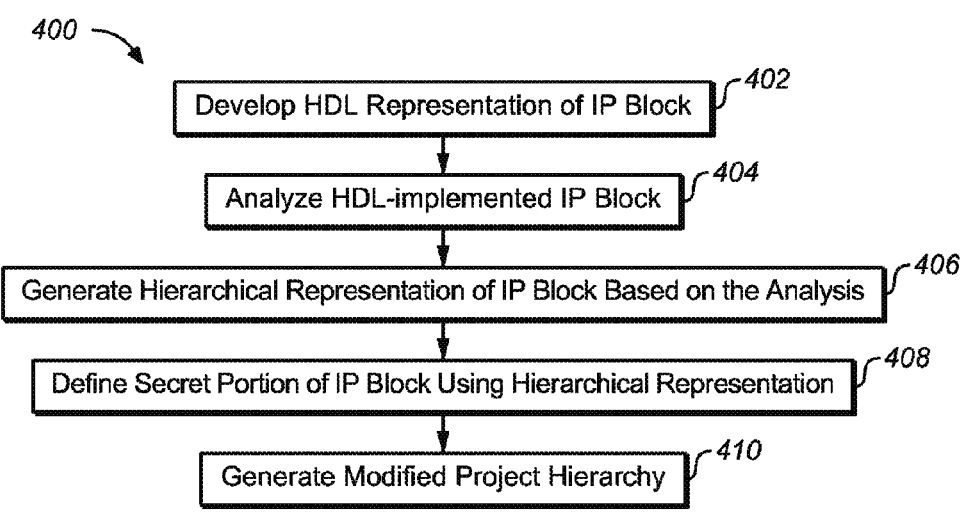
FIG. 4 shows a flowchart illustrating an example process for designing an IP block.

In some implementations, the design process enables an IP developer to generate both a secret portion and a public portion for an IP block. FIG. 4 shows a flowchart illustrating an example process 400 for designing an IP block. In some implementations, process 400 begins at 402 with an IP developer developing an HDL representation of an IP block. In some implementations, as described above, the IP developer designs or builds an HDL-implemented representation of the IP block using a CAD tool. For example, the CAD tool can include an input stage with a graphical user interface (GUI). The CAD GUI may include various "wizards" enabling efficient or convenient entry of information such as the parameters and specification for the IP block design. For example, the HDL-implemented IP block can be in the form of an RTL architecture. As described above, the IP developer can build the design using hard-coded logic or using pre-built functions, megafunctions, or other IP blocks. The IP developer also can use a high level synthesis abstraction language that can then be used by the CAD tool to generate an HDL description.

One example of a CAD tool with such HDL generation capabilities is the System on a Programmable Chip (SOPC) Builder available from Altera Corporation of San Jose, Calif. In some implementations, in addition to providing functionality to generate an HDL design, the CAD tool also can include functionality for performing analysis, synthesis, verification, placement and routing, and for the generation of configuration settings. That is, in some implementations, each of one or more of these functionalities can be a separate program or part of an integrated program within a single CAD tool. In some other implementations, one or more of the functionalities may be implemented in different hardware (and associated firmware and software) incorporated into or integrated within a single CAD tool. In some other implementations, the functionalities may be implemented in two or more different distinct tools. In some implementations in which each of a plurality of the functionalities just described are implemented as separate programs within a single CAD tool, an interface between the programs can be a database file, a log, or simply messages transmitted between the programs. For example, instead of writing a file to storage, the input stage can send messages directly to an HDL generator program that generates or integrates the HDL representation of the IP block. Similarly, the HDL generator program can provide the HDL representation directly to an analysis and synthesis tool.

At 404, the CAD tool then analyzes the HDL-implemented IP block. In some implementations, the CAD tool generates a project hierarchy (or hierarchical representation) of the IP block at 406 based on the analysis. In some implementations, the project hierarchy includes a hierarchical tree of all the modules of the IP block, including the modules each of these modules can instantiate, as well other connections or calls between the modules. At 408, the developer can then, using the CAD or other tool, partition or otherwise define the secret portion of the IP block by essentially boxing or blocking off the portion of the project hierarchy which the developer desires to include in the secret portion of the IP block. In so doing, the IP developer also defines a public portion of the IP block—the portions (if any) of the IP block which the developer will provide in HDL, netlist, or other functional representation form.

In some implementations, the CAD tool then generates, at 410, a modified project hierarchy that includes the public portion of the IP block but that does not include the modules within the secret portion of the IP block. In some implementations, the secret portion is represented in HDL as a call to instantiate a module that implements the secret portion, which itself can include several sub-modules. In some process flows, the public portion of the project hierarchy can then be delivered to an IP user. For example, the public portion can be delivered as the modified project hierarchy or in the form of an HDL. However, again, the secret portion of the design is not provided at the functional representation level whether in hierarchical (e.g., module) form, HDL form, or other functional representation form. Because the IP developer can provide the hierarchical representation of the public portion of the IP block to the IP user at this stage, the user can then begin work on incorporating or integrating the IP developer's IP block into the IP user's design. For example, by demarcating which modules form the secret portion of the IP block. In some implementations, the IP developer provides the modified project hierarchy or HDL-implemented design of the public portion to the IP user prior to the synthesis or verification of the IP developer's secret portion described below. For example, the IP developer may provide this early stage of the design to facilitate the overall speed and overall efficiency of the entire combined FPGA design process including those portions designed by the IP developer as well as those designed by the IP user receiving the IP developer's IP block. In some other implementations, the IP developer may provide the HDL-implemented design after synthesis and verification. Because the public portion can include a list or specification of all of the inputs and outputs of the entire IP block, the user can integrate the IP block within the user's own design without having knowledge of the secret portion of the IP block. In some implementations, the HDL file provided to the IP user includes a command or call (e.g., to a module or sub-module) that allows the IP user, using a CAD tool, to instantiate an instance of the public portion of the IP block in the user's own design. For example, the user's CAD tool, after instantiating the public modules, can connect the inputs and outputs of the IP block to one or more of the user's IP blocks or to other developers' IP blocks. The public portion also can include an interface to the secret portion, described below, as well as shared resources such as, for example, clock buffers, phase-locked loops (PLLs), and memory, among other shared resources.

Figures 5, 6A, 6B:
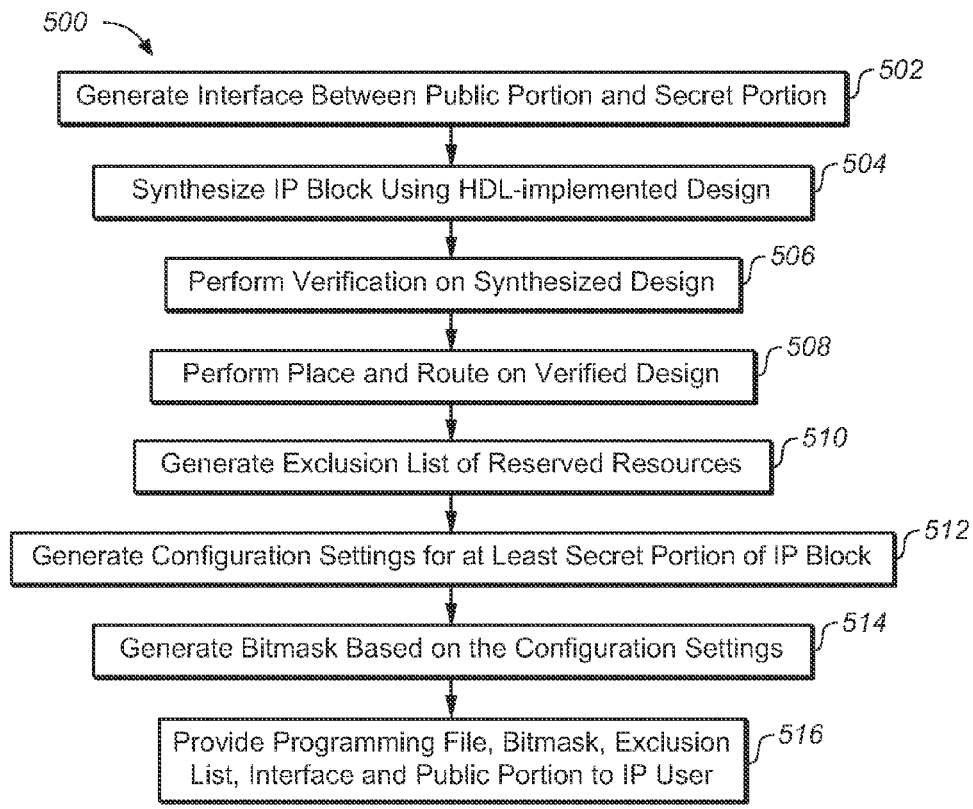
FIG. 5 shows a flowchart illustrating an example process for generating configuration settings for a secret portion of an IP block.
FIG. 6A shows an example bitmask.
FIG. 6B shows a bitstream that results from the bitwise application of the bitmask of FIG. 6A to an example IP developer's programming file.

FIG. 5 shows a flowchart illustrating an example process 500 for generating configuration settings for a secret portion of an IP block. For example, the process 500 can be performed at the request or under the guidance of the IP developer that designed the IP block according to the process 400. In some implementations, the process 500 begins immediately after process 400. In some other implementations, one or more steps or blocks of the process 500 are performed in parallel with or intermingled with various steps or blocks of the process 400. In some implementations, the process 500 begins at 502 with the CAD tool generating an interface in the HDL-implemented design between the public portion of the IP block and the secret portion of the IP block (described above with reference to the process 400 of FIG. 4) based on the modified project hierarchy generated at 410, or based on other functional or module level information about the interaction between the secret portion and the public portion. In some such implementations, the interface can be implemented with boundary LUTs. For example, the IP developer can design the IP block, or the CAD tool can generate the IP block, such that it includes LUTs at the boundary between the secret portion of the IP block and the public portion of the IP block. The boundary LUTs map signals and resources input to the boundary LUTs from the public portion to resources within the secret portion and map signals and resources output from the secret portion to resources within the public portion. In this way, while a CAD tool generally needs to have knowledge that it needs to route particular signals to particular boundary LUTs, the CAD tool does not need knowledge of the mapping performed downstream of an input LUT or upstream of an output LUT within the secret portion. In some such implementations, a boundary LUT can be defined logically as a single input buffer, the output of which is routed to a particular logic cell 218 in the physical FPGA design. In some such implementations, the boundary LUTs themselves are physically instantiated with CRAM programming bits using the LUTs 220 or other physical LUTs of the FPGA device 100. In some other implementations, one or more portions of the interface between the secret portion and public portion can be implemented with the functionality of a flip-flop, register, wire, or other logic or circuit component as physically instantiated with CRAM programming bits.

In some other implementations, the IP developer does not provide any public portion of the IP block to the IP user. For example, the IP developer may desire to keep the entire design secret. In some such implementations, the boundary interface generated at 502 is the only netlist, HDL, or other functional level representation of the IP block provided to the IP user. But rather than being an interface between the secret portion and a public portion, the interface is an interface between the secret portion and the outside (e.g., the IP user's FPGA design integrating the secret portion).

In some implementations, the process 500 proceeds at 504 with the IP developer's CAD tool performing a synthesis operation on at least the HDL-implemented representation of the secret portion of the IP block. Some examples of synthesis tools are Leonardo Spectrum, available from Mentor Graphics Corporation of Wilsonville, Oreg. and Synplify available from Synplicity Corporation of Sunnyvale, Calif. In some implementations, the CAD tool then, at 506, performs a verification operation on the synthesized design. Some example verification tools include Synopsys VCS, VSS, and Scirocco, available from Synopsys Corporation of Sunnyvale, Calif. and Cadence NC-Verilog and NC-VHDL available from Cadence Design Systems of San Jose, Calif. In some implementations, after verification at 506, the synthesized design can be provided to a physical design tool or program within the CAD tool where, at 508, a place and route operation is performed. A typical place and route tool locates logic cells on specific logic elements of a target hardware device and connects wires between the inputs and outputs of the various logic elements in accordance with the logic and security required to implement a design.

In some implementations, the CAD tool generates an exclusion list at 510 based on the output of the place and route operation. The exclusion list includes all of the resources that are to be reserved only for use by the secret portion of the IP block in the user's final FPGA design. Because the IP user receiving the IP developer's IP block will have no knowledge of how the secret portion of the IP block is using the actual FPGA hardware, the IP user ensures that the IP user's CAD tool, when integrating the IP developer's IP block with the IP user's design, doesn't use resources that the IP developer has reserved for the secret portion by avoiding using resources specified in the exclusion list. The resources specified in the exclusion list can include, for example, physical resources that will implement various logic blocks 102, logic cells 218, LUTs 220, I/O pads 104, switches 106, or other portions of the routing architecture 108 that are to be used only by the secret portion of the IP block.

A programmable logic configuration stage can take the output of the place and route tool and generate, at 512, configuration settings for an FPGA device 100. For example, the place and route tool and the logic configuration stage can be provided in the Quartus Development Tool, available from Altera Corporation of San Jose, Calif. As will be appreciated by one of ordinary skill in the art, a variety of synthesis, place and route, and programmable logic configuration tools can be used in various implementations. In some other implementations, a CAD tool can be configured to generate the configuration settings for an FPGA directly from an HDL-implemented design. In some implementations, the output of the configuration stage at 512 is a programming file that includes the configuration settings in the form of programming bits for the secret portion. In some implementations, while the programming file generally includes all the bits for all of the CRAMs 322 for a given physical FPGA hardware architecture, all of the bits in the programming file that are not generated for the IP developer's IP block are assigned default values. In some implementations, the bits designated for the public portion of the IP block also are assigned default values. In some implementations, the timing, power, or other requirements of the IP block can then be verified again, this time using the programming bits. For example, the programming bits for the secret portion, the public portion, and the interface between the secret portion and public portion (which may be included as a part of the public portion) can then be programmed into a physical FPGA device that is then subjected to verification. The results of the verification can then be provided to a third party such as a certification body (such as TÜV Rheinland). Additionally or alternatively, in some implementations, a third party (such as TÜV Rheinland) can perform the verification.

In some implementations, the process 500 proceeds at 514 with generating a bitmask. FIG. 6A shows an example bitmask 632 for didactic purposes. The bitmask generally identifies the bits in the IP developer's programming file that are used by the secret portion. Although the illustrated example bitmask 632 is only an 8×8 array of 64 bit values, it should be appreciated that the bitmask required for some implementations can be much larger, for example, having hundreds, thousands, or more bit values. Because the programming bits required for the secret portion of the IP block can constitute only a portion of an entire programming file, the bitmask is used to identify those bits in the programming file that are to be used to configure the secret portion. In some implementations in which the secret portion of the IP block is to be configured into only a single logic block 102 or other portion, the bitmask can include just the bits associated with the logic block or other portion. In some other implementations, the bitmask can include bits for the entire programming file. In the illustrated example, all bits 634 having a bit value of logic value "1" indicate that the corresponding bit in the programming file is to be used in configuring the secret portion of the IP block. In contrast, all bits 636 having a bit value of logic value "0" indicate that the corresponding bit in the programming file is not to be used in configuring the secret portion of the IP block.

In some implementations, at 516, the programming file (including the configuration settings/programming bits for the secret portion of the IP block), the bitmask, the exclusion list of resources, the HDL or netlist-implemented interface (or other physical-level representation of the interface between the secret and public portions), and the HDL-implemented public portion (or public netlist or other functional level representation of the public portion), are provided to the IP user. While described as a single step 516, in some other implementations, various provisions of step 516 can be made independently or separately. For example, the exclusion list can be provided to the IP user prior to providing the programming bits for the secret portion (e.g., to facilitate speed and efficiency in the entire FPGA design process as a whole). The interface (which may be a part of the public portion) in whatever form provided to the IP user (e.g., as HDL or as part of a public netlist) discloses to the IP user the locations of the boundary LUTs or other interface components. This allows the IP user's place and route operation to connect the IP user's design with the IP developer's IP block. Thus, by disclosing the interface, the public netlist or HDL-implemented design of the public portion, as well as the exclusion list to the IP user, the IP user then has all the information (e.g., the IP block boundaries, inputs, and outputs, and resources) that the IP user needs to integrate the IP block with the IP user's own design without requiring knowledge of the functionality of the secret portion.

In some other implementations, rather than providing an exclusion list as just described, the IP developer instead uses floor-planning techniques to select and to indicate to the IP user portions or regions of the FPGA device that are to be reserved for the IP developer's IP block, and specifically, for the secret portion of the IP block. In some such implementations, the IP developer discloses only the maximal set of resources that may be used by the secret portion of the IP block, but not the specific resources that were actually generated by the IP developer's place and route operation. The method of floorplanning is particularly advantageous in cases where multiple IP developers are providing IP blocks for one user. If a floorplan is agreed upon in advance, and each IP developer's place-and-route is constrained to use resources only in the floorplanning region assigned to that IP developer, the IP user is assured that no resources will be in conflict when the various IP blocks are integrated into one design.

In some implementations, some or all of the programming file, including the bitstreams containing the programming bits, can be encrypted prior to delivery to the IP user. In some implementations, at least the programming bits for the secret portion are encrypted. FPGA devices, such as FPGA device 100, also can include decryption logic for decrypting encrypted bitstreams. In such implementations, it is generally the manufacturer or developer of the FPGA hardware that determines the encryption scheme and then provides methods, keys, or other encryption technologies to developers or users to encrypt their programming bits. In some such implementations, the FPGA device can be configured to decrypt encrypted programming bitstreams on-the-fly as they are provided to the FPGA device 100 and prior to loading into the CRAMs 322. FIG. 7 shows a flowchart illustrating an example process for integrating an IP block into an IP user's design. In some implementations, the process 700 begins at 702 with the IP user generating or importing an FPGA design into the user's CAD tool. The user's FPGA design will generally include one or more IP blocks and that will interface with at least one IP block generated by another IP developer. In some implementations, the IP user receives, at 704, a public netlist or HDL-implemented public portion of an IP developer's IP block, such as that described with reference to the processes 400 and 500 of FIGS. 4 and 5, respectively. In some implementations the public netlist also includes the locations of the interface inputs and outputs to the secret IP block to which the IP user's CAD tool must connect input and output signal wires on the chip. In some implementations the only public netlist provided by the IP developer is the implementation of the boundary inputs and outputs to the secret IP (e.g. boundary LUTs). The IP user also receives, at 706, the exclusion list generated by the IP developer's CAD tool, which specifies which resources in the FPGA design are to be reserved for use by the secret portion of the IP block. At 708, the IP user imports or otherwise provides the public netlist or HDL-implemented public portion and the exclusion list into the user's CAD tool. At 710, the CAD tool integrates the public portion with the rest of the user's design, for example, at the RTL, HDL, or netlist level.

In some implementations, the process 700 proceeds at 712 with the IP user's CAD tool performing an analysis and synthesis operation on the integrated design. In some implementations, the user's CAD tool then performs, at 714, a verification operation on the synthesized design. As described above, in some implementations, after verification at 714, the verified design can be provided to a physical design tool or program within the CAD tool where, at 716, a place and route operation is performed. During the place and route operation, the IP user's CAD tool can use the exclusion list to guarantee that it does not use resources reserved by the secret IP, and the synthesized interface between the secret and public portions (provided by the IP developer) to route the inputs and outputs between the secret and public portions of the IP block as indicated the IP developer thus linking up the IP block provided by the IP developer with the IP user's circuit design. A programmable logic configuration stage can then take the output of the place and route tool and generate, at 718, configuration settings for the IP user's design to be programmed into a physical FPGA device.

In some implementations, the output of the configuration stage at 718 is a programming file that includes the configuration settings in the form of programming bits for the entire FPGA device including the public portion of the IP developer's IP block. As described above (in the context of the IP developer's programming file), while the IP user's programming file generally includes bits for all of the CRAMs 322 for a given physical FPGA hardware architecture, all of the bits in the programming file that are not generated for the IP user's design, such as those reserved by the exclusion list for the secret portion of the IP developer's design, can be assigned default values. FIG. 8A shows an example portion 840 of the IP user's programming file in which the bits 834 that are to be used by the secret portion are identified with a default value (illustrated as "d") while the bits 836 that are not used by the secret portion include the values generated for them at 718. Because the IP user's CAD tool was provided with the exclusion list, this ensures that the place and route operation performed at 716 did not use any resources specified in the exclusion list, and thus, this ensures that the bits 834 will be left at default values. The IP user's CAD tool can verify that the tool correctly obeyed the exclusion list by comparing the generated CRAMs 840 with the provided bit mask 632—ensuring that no bit included with '1' in the bitmask 634 is assigned a value other than default, as in 834. In some implementations, at 720, IP user receives (if he has not done so already) the IP developer's programming file, such as that described above with reference to the process 500 of FIG. 5. At 722, the CAD or other tool then merges the IP developer's programming file with the IP user's programming file; that is, to merge the configuration settings/programming bits of the secret portion with the configuration setting/programming bits generated by the IP user (including the bits to implement the public portion and the interface of the IP developer's IP block).

Figure 9:
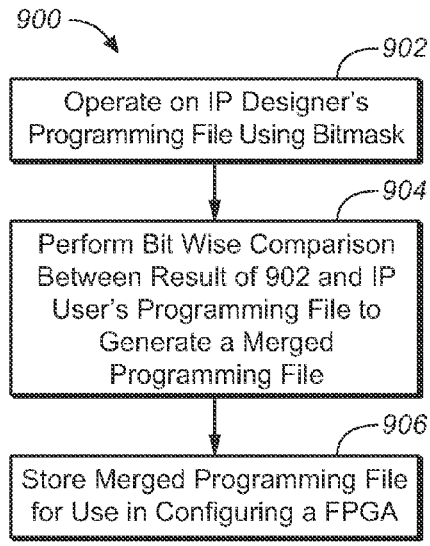
FIG. 9 shows a flowchart illustrating an example process for merging configuration settings for a secret portion of an IP block into an IP user's configuration settings.

FIG. 9 shows a flowchart illustrating an example process 900 for merging configuration settings for a secret portion of an IP block into an IP user's configuration settings. In some implementations, the process 900 is an example implementation of step 722 of process 700. In some implementations, the process 900 begins at 902 with the user's CAD tool operating on the IP developer's (previously received) programming file with the bit mask also provided by the IP developer. In some implementations, a bitwise comparison or bitwise addition is performed at 902. For example, FIG. 6B shows a bitstream (shown as a two-dimensional array) 638 that results from the bitwise application of the bitmask of FIG. 6A to an example IP developer's programming file. As shown, any bit 635 in the array of FIG. 6B that corresponds in location to a bit 634 in the bitmask of FIG. 6A keeps the value in the IP developer's programming file. Any bit 637 in the array of FIG. 6B that corresponds in location to a bit 636 in the bitmask of FIG. 6A is set to, for example, a default value. The process 900 can then proceed in 904 with the IP user's CAD or other tool performing a bitwise comparison between the result obtained at 902, as shown in FIG. 6B (for didactic purposes), and the IP user's programming file 840, as shown in FIG. 8A (for didactic purposes). For example, for each bit 635 in FIG. 6B that corresponds to a one of the secret programming bits, the value of that bit 635 is then added or otherwise entered into the IP user's programming file 840 in place of the default value in the corresponding bit location

834. FIG. 8B shows a merged programming file (or portion thereof) 842 that results from the bitwise application of the result 638 of FIG. 6B with the portion of the IP user's programming file 840 of FIG. 8A. As shown in the merged programming file 842, the bits 835 now have the values of the secret programming bits 635 that formerly held default values in bits 834 of the IP user's original programming file 840. In some implementations, at 906, the merged programming file is then stored in, for example, an external non-volatile memory (e.g., Flash) on the same board as the physical FPGA device. As described above, upon powering up the device, logic on the board is configured to cause the FPGA to enter a programming or configuration mode, to retrieve the programming bits from the non-volatile memory, and to load the retrieve programming bits into the FPGA device. Logic within the FPGA device then loads the programming bits into the appropriate CRAMs. By loading the values of the programming bits for the secret portion just as the IP developer had generated them, the IP developer can be assured that the functionality of the secret portion is as it was verified by the IP developer's CAD tool, while not disclosing the implementation of the secret portion to the IP user.

Figure 10:
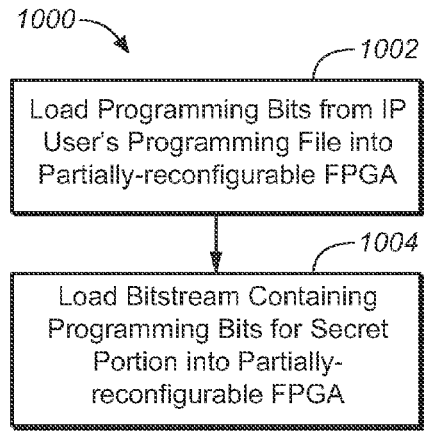
FIG. 10 shows a flowchart illustrating an example process for merging configuration settings for a secret portion of an IP block into an IP user's configuration settings.

FIG. 10 shows a flowchart illustrating an example process 1000 for merging configuration settings for a secret portion of an IP block into an IP user's configuration settings. In some implementations, the process 1000 is an example implementation of step 722 of process 700. In some implementations, the process 1000 begins at 1002 with loading the programming bits of the IP user's programming file (e.g., as obtained at 718 of the process 700 of FIG. 7) into a physical FPGA device. In such implementations, the FPGA device is advantageously a partially-reconfigurable FPGA device. As described above, typically, configuring or reconfiguring an FPGA requires that the FPGA is in a configuration mode while an external controller or other logic loads an entire FPGA design into the FPGA device. In contrast, partial reconfiguration enables certain (e.g., critical) portions of the FPGA to continue operating while a controller loads a partial design into a reconfigurable module on the partially-reconfigurable FPGA device. Some time later, at 1004, the IP user can load the bitstream containing only those programming bits generated for the secret portion into the FPGA. For example, rather than receiving an entire IP developer's programming file at step 720 of process 700, the IP developer can select to only send a bitstream containing the programming bits for the secret portion. In other implementations, the IP developer can send an entire programming file and bit mask as described above to enable the IP user to extract a bitstream containing only those programming bits for the secret portion. Additionally, by sending the bitmask, the IP user also can ensure that the IP user's programming file doesn't use any of the bits reserved for the secret portion. As described above, the bitstream containing the programming bits for the secret portion can first be stored in a non-volatile memory on a board with the FPGA. A controller or other logic on a board with the FPGA can subsequently retrieve the bitstream and load the programming bits into the partially-reconfigurable FPGA device into the appropriate CRAMs. In some implementations, the bitstream containing the programming bits for the secret portion is received from the IP developer in an encrypted form so that the IP user has no knowledge of the bit values that were used to implement the secret portion of the IP developer's IP block; rather, the IP user only has knowledge of the bit locations that were given in the bit mask. As described above, some FPGA devices also can include decryption logic for decrypting encrypted bitstreams. In such implementations, it is generally the manufacturer or designer of the FPGA hardware that determines the encryption scheme and then provides methods, keys, or other encryption technologies to developers or users to encrypt their programming bits. In some such implementations, the FPGA device can be configured to decrypt the encrypted programming bitstream as it is provided to the FPGA device and prior to loading into the CRAMs.

FPGAs typically have many resources that will be shared among IP blocks, such as, for example, a global routing network or "tree," as well as other programmable power settings. In some implementations, the IP developer specifies to the IP user the topology of a global routing tree. In some such implementations, no functionality of the IP developer's IP block is disclosed at this time; rather, only information about what clock signals or other global signals are used, and in which regions of the FPGA design they are used, is disclosed. This information can be provided to the IP user even before the IP developer provides the public portion of the IP block to the IP user. The IP user then has the option of adding additional fanout to these signals for portions of the IP user's design that connect to the clocking network, for example, in the place and route operation performed at 716. For example, in either of the processes 900 or 1000 described above, when the IP developer generates the bitmask at step 514, the tool can additionally generate a network mask containing the bits for all of the wires or routing resources selected by the IP developer for the clocking network, along with the values/settings for those bits. Using the set of bits in the network mask, the IP user can verify that the programming file the IP user generates at 718 has identical values for all of the bits specified in the network mask. That is, that the clocking topology to be implemented in the physical FPGA remains the same. Power settings can be pre-selected and delivered by an IP user is a similar manner. For example, the IP developer can provide to a user a list of the power settings the developer has selected in the form of a mask with the bits to make those settings, and a programming file with the values for those bits. The IP user can then integrate those power settings into the user's design, as described above, and verify that the output of the design implements the power settings in the same manner that the IP developer implemented them.

Figure 11A:
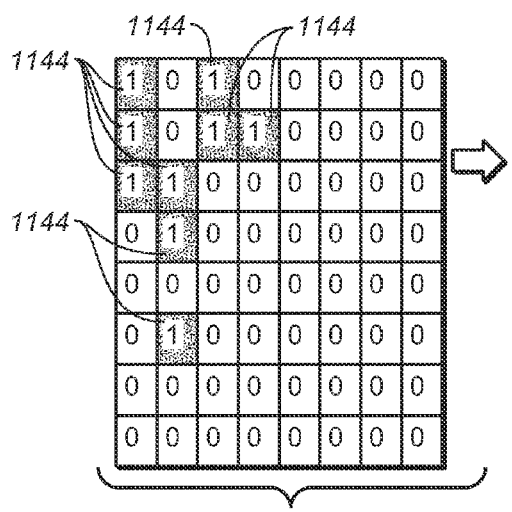
FIG. 11A shows an example bit array of a portion of an IP developer's programming file.
Figure 11B:
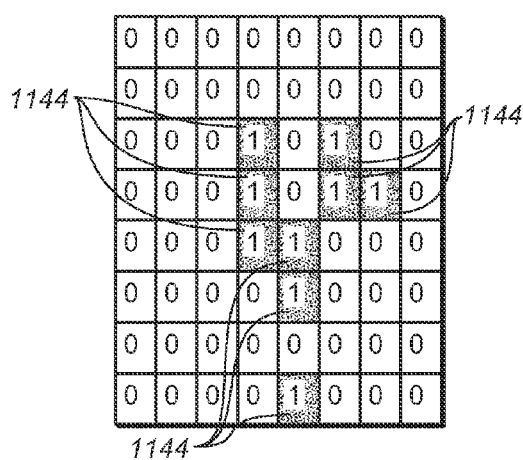
FIG. 11B shows the array of FIG. 11A after translocation of the programming bits for the secret portion.

Additionally, in implementations in which the physical FPGA architecture into which the design is to be configured is arranged with uniformity in the chip floorplan, it can be possible to instantiate an IP block anywhere on the chip. In this manner, the IP user can determine where in the FPGA to implement the IP developer's IP block. For example, the IP user's CAD tool can, as before, take the programming bits for the secret portion received from the IP developer. To implement the IP block into a different floorplanning region or a different logic block, the IP user's CAD tool can trans-locate the public portion of the IP block's physical implementation (if provided), the interface entity locations, and also add an offset in the IP developer's programming file thereby indicating to the CAD tool the new set of resources that are to be reserved for the secret portion. In this way, the IP user can trans-locate the design of the IP block. For example, FIG. 11A shows an example bit array of a portion of an IP developer's programming file while FIG. 11B shows the array of FIG. 11A after translocation of the programming bits 1144 for the secret portion. In order to utilize the translocation functionality illustrated in FIGS. 11A and 11A, the IP user would also generally have to translocate the resources given in the exclusion list received at 706.

As described above, in some instances, an IP block or other portion of an entire circuit design may include functions or design portions that require functional safety certification with a certification body as well as functions or design portions that do not require such certification. In some cases, after such a design is synthesized, verified, and certified as compliant with the functional safety requirements, the developer or a downstream user may seek to change some functions or portions of the design that do not require functional safety certification. However, as is also described above, conventional techniques require that all portions of the design be re-certified. That is, because a CAD tool may synthesize, place, route, and generate programming bits for an HDL-implemented design differently each time the tool is run (especially if any of these processes are performed on different tools), even though the safety-critical portion of the design was not changed, the programming bits for the safety-critical portion of the design cannot be guaranteed to be identical after each round of synthesis and generation. Thus, conventionally, although changes are intentionally made only to the non-safety-critical portion of the larger design, because the programming bits for the safety-critical portion cannot be guaranteed to remain identical to those certified by the certification body, the certification would not attach to the re-synthesized and regenerated design. To gain the certification of the certification body that the functional requirements have been met, the certification body or a downstream user would likely require a re-certification. As noted above, such certification can be quite costly as well as time-consuming.

However, by utilizing particular implementations, a developer can partition a design to include both a safety-critical portion (a portion requiring certification of functional safety requirements by a certification body) as well as a non-safety-critical portion (a portion not requiring such certification). In some implementations, the developer provides at least the safety-critical portion of the design to a third-party certification body (such as TÜV Rheinland) in the form of CRAM programming bits. The programming bits for the safety-critical portion can be provided to the third-party certification body for verification and certification in the form of a bitstream, which may be part of an entire programming file. With the correct design and partitioning of the safety-critical portion from the non-safety-critical portion, the developer or a downstream user can make changes to the non-safety-critical portion of the design while ensuring that the CRAM programming bits for the safety-critical portion remain unchanged—and still entitled to certification by the certification body as meeting the functional safety requirements of the certification body—despite having to re-synthesize and regenerate the programming bits for the non-safety-critical portion. A certification body or other third party may require proof that the safety-critical portion remains unchanged and entitled to certification. To ensure such compliance, a check of the bitstream section of the entire programming file that relates to the safety-critical portion can be made. For example, a bitmask generated by the developer of the safety-critical portion can be used to perform a bitwise comparison on the final programming file to ensure that the programming bits corresponding to the safety-critical portion remain unchanged and entitled to certification.

Figure 12:
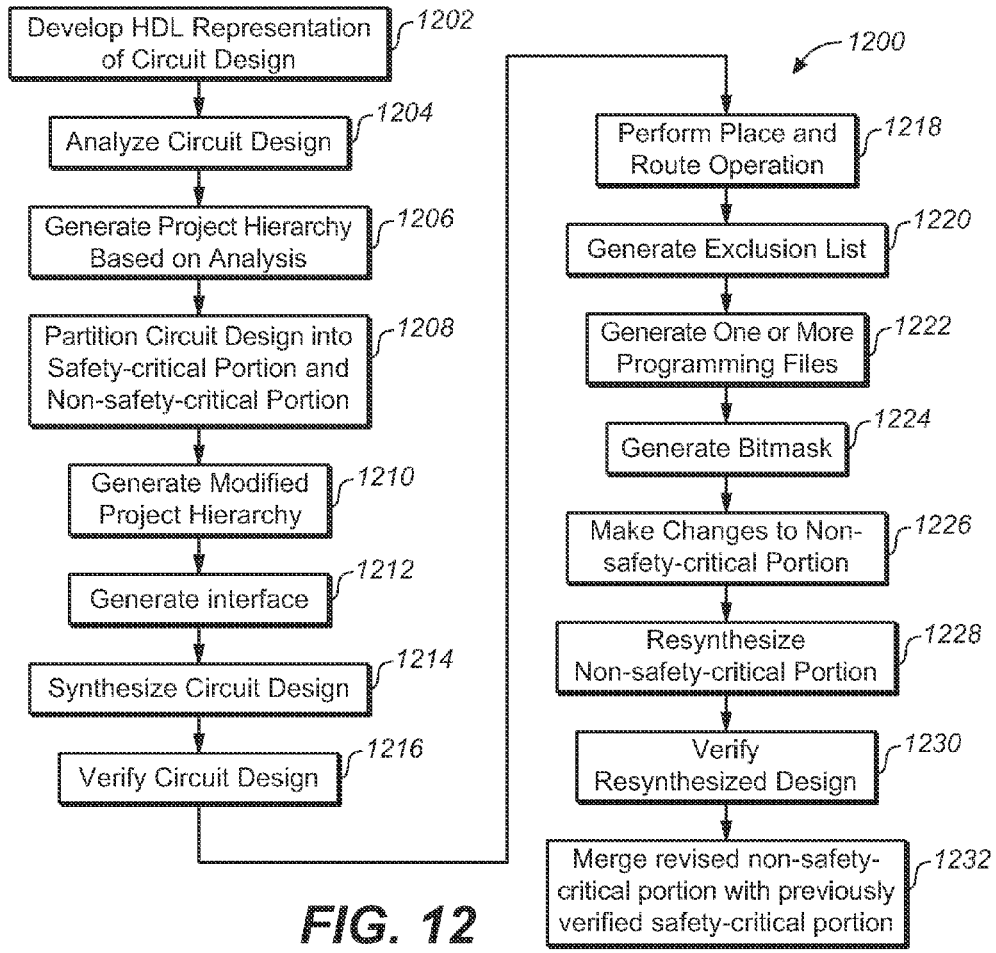
FIG. 12 shows a flowchart illustrating an example process for generating a circuit design, such as an IP block for an FPGA, that includes both a safety-critical portion as well as a non-safety-critical portion.

FIG. 12 shows a flowchart illustrating an example process 1200 for generating a circuit design, such as an IP block for an FPGA, that includes both a safety-critical portion as well as a non-safety-critical portion. In many respects or aspects, steps of the process 1200 are similar to one or more steps of the processes 400 and 500 described above with reference to FIGS. 4 and 5 with the safety-critical portion being analogous to the secret portion and the non-safety-critical portion being analogous to the public portion. In some implementations, process 1200 begins at 1202 with a designer developing an HDL representation of the circuit design. In some implementations, as described above, the designer develops or builds an HDL-implemented representation of the design using a CAD tool. At 1204, the CAD tool then analyzes the HDL-implemented circuit design. In some implementations, the CAD tool generates a project hierarchy (or hierarchical representation) of the circuit design at 1206 based on the analysis. In some implementations, the project hierarchy includes a hierarchical tree of all the modules of the circuit design, including the modules each of these modules can instantiate, as well other connections or calls between the modules.

At 1208, the developer can then, using the CAD or other tool, partition or otherwise define the safety-critical portion of the circuit design (which the developer may wish to keep secret as described above) by essentially boxing or blocking off the portion of the project hierarchy which the developer desires to include in the safety-critical portion of the circuit design. In so doing, the developer also defines a non-safety-critical portion of the circuit design. In some other implementations, the safety-critical portion of the circuit design can be intentionally located in a known floorplan region of the entire FPGA or other programmable logic design. In some implementations, the CAD tool then generates, at 1210, a modified project hierarchy that includes the non-safety-critical portion of the circuit design but that does not include the modules within the safety-critical portion of the circuit design. In some implementations, the safety-critical portion is represented in HDL as a call to instantiate a module that implements the safety-critical portion, which itself can include several sub-modules.

In some implementations, the CAD tool then generates, at 1212, an interface in the HDL-implemented design between the non-safety-critical portion of the circuit design and the safety-critical portion of the circuit design based on the modified project hierarchy generated at 1210, or based on other functional or module level information about the interaction between the safety-critical portion and the non-safety-critical portion. In some such implementations, the interface can be implemented with boundary LUTs. For example, the developer can design the circuit design, or the CAD tool can generate the circuit design, such that it includes LUTs at the boundary between the safety-critical portion and the non-safety-critical portion of the circuit design. The boundary LUTs map signals and resources input to the boundary LUTs from the non-safety critical portion to resources within the safety-critical portion and map signals and resources output from the safety-critical portion to resources within the non-safety-critical portion. In this way, while a CAD tool generally needs to have knowledge that it needs to route particular signals to particular boundary LUTs, the CAD tool does not need knowledge of the mapping performed downstream of an input LUT or upstream of an output LUT within the safety-critical portion.

In some implementations, the process 1200 proceeds at 1214 with a CAD tool performing a synthesis operation on the HDL-implemented representation of the safety-critical portion, the non-safety critical portion, and the interface between the safety-critical and non-safety-critical portions of the circuit design. In some implementations, the result of the synthesis at 1214 is a physically-realizable gate netlist. In some implementations, the CAD tool then, at 1216, performs a verification operation on the synthesized design. In some implementations, after verification at 1216, the synthesized design can be provided to a physical design tool or program within the CAD tool where, at 1218, a place and route operation is performed. In some implementations, the CAD tool generates an exclusion list at 1220 based on the output of the place and route operation. The exclusion list includes all of the resources that are to be reserved only for use by the safety-critical portion of the circuit design.

A programmable logic configuration stage can take the output of the place and route tool and generate, at 1222, configuration settings for an FPGA or other programmable logic device. As described above, a variety of synthesis, place and route, and programmable logic configuration tools can be used in various implementations. In some implementations, the output of the configuration stage at 1222 includes one or more programming files. For example, the configuration stage may output at 1222 a first programming file that includes at least the configuration settings in the form of programming bits for the safety-critical portion. In some such implementations, while the first programming file includes all the bits for all of the CRAMs for a given physical FPGA hardware architecture, all of the bits in the programming file that are not generated for the safety-critical portion, the non-safety critical portion, or the interface of the developer's design are assigned default values. In some implementations, the configuration stage may additionally output a second programming file that includes only the programming bits for the safety-critical portion but that includes default values for all of the other bits of the design including the bits designated for the non-safety critical portion.

In some implementations, the timing, power, and/or other functional safety requirements of the circuit design can then be verified again, this time using the programming bits. For example, the programming bits for the safety-critical portion, the non-safety critical portion, and the interface between the safety-critical portion and the non-safety critical portion can then be programmed into a physical FPGA device that is then subjected to verification to ensure compliance with functional safety requirements. The results of the verification can then be provided to a third party such as a certification body (such as TÜV Rheinland). Additionally or alternatively, in some implementations, a third party (such as TÜV Rheinland) can perform the verification. In some implementations, the first programming file including the configuration settings for both the safety-critical portion and the non-safety-critical portion as well as the interface is provided to the certification body to ensure compliance with functional safety requirements.

In some implementations, the process 1200 proceeds at 1224 with generating a bitmask similar to that shown and described with reference to FIG. 6A above. The bitmask generally identifies the bits in the developer's programming file that are used by the safety-critical portion (as opposed to the secret portion as described with reference to FIG. 6A). Because the programming bits required for the safety-critical portion of the circuit design may constitute only a portion of an entire programming file, the bitmask is used to identify those bits in the programming file that are used to configure the safety-critical portion. In some implementations in which the safety-critical portion of the circuit design is to be configured into only a single logic block or other portion, the bitmask can include just the bits associated with the logic block or other portion. In some other implementations, the bitmask can include bits for the entire programming file. For example, all bits in the bitmask having a bit value of logic value "1" can indicate that the corresponding bit in the programming file is to be used in configuring the safety-critical portion of the circuit design. In contrast, all bits in the bitmask having a bit value of logic value "0" can indicate that the corresponding bit in the programming file is not to be used in configuring the safety-critical portion—these bits may be used to program, for example, the non-safety-critical portion of the developer's circuit design or to program other portions of the final FPGA design.

As described above, it is often or typically the case that a developer or user may wish to make changes to the non-safety-critical portion of the circuit design but not make changes to the safety-critical portion. However, as described above, conventional techniques generally require recertification of the entire design even though the safety-critical portion has not been intentionally changed. But with implementations described herein, a developer can make changes to the non-safety critical portion without requiring recertification. For example, a developer can makes changes to the HDL or other abstraction level representation of the non-safety-critical portion of the circuit design at 1226 while ensuring that the HDL representation or other abstraction level representation of the non-safety-critical portion properly connects to the interface generated at 1212.

In some implementations, a CAD tool then performs another synthesizing operation on the non-safety critical portion and the interface at 1228. In some implementations, the result of the synthesis at 1228 is a physically-realizable gate netlist corresponding to the non-safety critical portion. In some implementations, the CAD tool then, at 1230, performs a verification operation on the design that was synthesized at 1228. At 1232, the CAD or other tool then merges the netlist corresponding to the revised non-safety-critical portion generated at 1228 with the portion of the netlist generated at 1214 that corresponds to the previously verified safety-critical portion.

Figure 13:
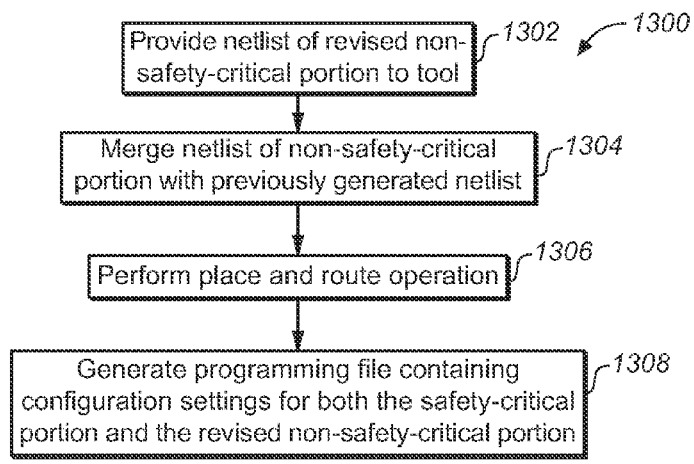
FIG. 13 shows a flowchart illustrating an example process for merging the revised non-safety-critical portion with the previously verified safety-critical portion.

FIG. 13 shows a flowchart illustrating an example process 1300 for merging the revised non-safety-critical portion with the previously verified safety-critical portion. In some implementations, the process 1300 is an example implementation of step 1232 of process 1200. In some implementations, the process 1300 begins at 1302 with providing the netlist of the revised non-safety critical portion synthesized at 1228 to a physical design tool or program within the CAD tool. Using the tool, the netlist synthesized at 1228 is then merged, at 1304, with the netlist generated at 1214. That is, such that the newly resynthesized netlist of the revised non-safety critical portion takes the place of the portion of the netlist generated at 1214 that corresponds to the non-safety critical portion prior to making changes at 1226. In such an implementation, the portion of the netlist generated at 1214 that corresponds to the previously verified safety-critical portion is not altered. At 1306, a place and route operation is then performed on the merged netlist. During the place and route operation, the CAD tool can use the exclusion list generated earlier to guarantee that it does not use resources reserved by the safety-critical portion to route the inputs and outputs between the safety-critical and non-safety-critical portions of the design. Thus, in such an implementation, the place and route operation performed at 1306 preserves the placement of logic and routing for the previously verified safety-critical portion determined from the place and route operation performed earlier at 1218.

A programmable logic configuration stage can take the output of the place and route tool and generate, at 1308, configuration settings for the previously verified safety-critical portion, the revised non-safety-critical portion, and the interface. In some implementations, the output of the configuration stage at 1308 is a programming file that includes the configuration settings in the form of programming bits for the previously verified safety-critical portion, the revised non-safety-critical portion, and the interface. In this way, the resultant merged programming file contains the identical configuration programming bits for the safety-critical portion as they were previously-certified as well as the configuration programming bits for the revised non-safety-critical portion. This process can be repeated whenever the developer or a user desires to change the non-safety-critical portion without requiring recertification.

Figure 14:
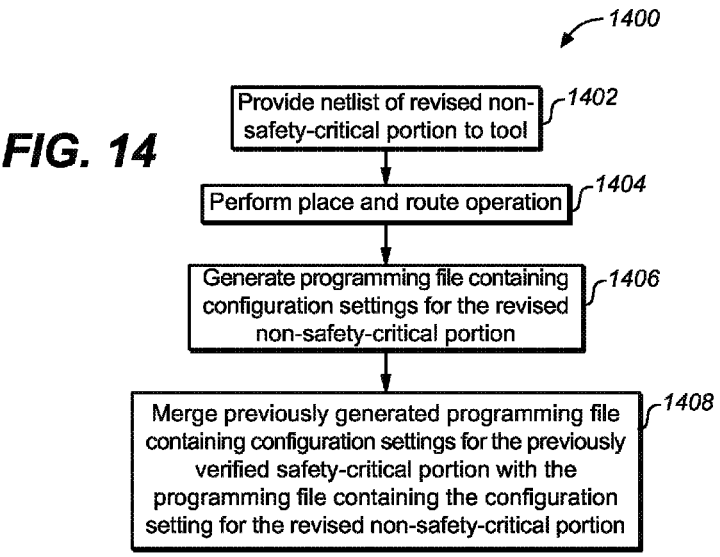
FIG. 14 shows a flowchart illustrating another example process for merging the revised non-safety-critical portion with the previously verified safety-critical portion.

FIG. 14 shows a flowchart illustrating another example process 1400 for merging the revised non-safety-critical portion with the previously verified safety-critical portion. In some implementations, the process 1400 is an example implementation of step 1232 of process 1200. In some implementations, the process 1400 begins at 1402 with providing the netlist of the revised non-safety critical portion synthesized at 1228 to a physical design tool or program within the CAD tool, where at 1404, a place and route operation is then performed. During the place and route operation, the CAD tool can use the exclusion list generated earlier to guarantee that it does not use resources reserved by the safety-critical portion to route the inputs and outputs between the safety-critical and the revised non-safety-critical portions of the design. Thus, in such an implementation, the place and route operation performed at 1404 preserves the placement of logic and routing for the previously verified safety-critical portion determined from the place and route operation performed earlier at 1218. A programmable logic configuration stage can take the output of the place and route tool and generate, at 1406, configuration settings for the revised non-safety-critical portion and the interface. In some implementations, the output of the configuration stage at 1406 is a third programming file that includes the configuration settings in the form of programming bits for the non-safety-critical portion and the interface. In some implementations, the CAD tool can verify that the tool correctly obeyed the exclusion list by comparing the generated configuration settings for the revised non-safety-critical portion with the bit mask generated at 1224.

In some implementations, at 1408, the CAD or other tool then merges the second programming file generated at 1222 containing the programming bits for the previously-verified safety-critical portion with the third programming file generated at 1406 containing the programming bits for the revised non-safety-critical portion and the interface. For example, the two programming files can be merged using the bitmask generated at 1224 as similarly described in the process 900 illustrated with reference to FIG. 9 with the safety-critical portion being analogous to the secret portion and the non-safety-critical portion being analogous to the public portion. In this way, the resultant merged programming file contains the originally-generated configuration programming bits for the safety-critical portion as they were certified by the certification body as well as the configuration programming bits for the revised non-safety-critical portion. This process can be repeated whenever the developer or a user desires to change the non-safety-critical portion without requiring recertification.

A certification body or other third party may require proof that the safety-critical portion remains unchanged and entitled to certification. To ensure such compliance, a check of the bitstream section of the entire programming file that corresponds to the safety-critical portion can be made. For example, the bitmask generated at 1224 as well as the final programming file generated at step 1308 or at step 1408 (depending on the implementation) can also be provided to the certification body. The certification body can then use the bitmask to perform a bitwise comparison between the final programming file and the programming file generated at 1222 that was previously certified by the certification body to ensure that the programming bits corresponding to the safety-critical portion remain unchanged and entitled to certification.

Furthermore, in some implementations, for security or tracking purposes, it may be desirable to generate a hash of the secret portion described with reference to FIGS. 4-11, the safety-critical-portion described with particular reference to FIGS. 12-14, and/or any of the bitmasks described above. For example, the programming bits for the secret portion, the safety-critical-portion, or any of the bitmasks described above can be operated on by a cryptographic hash function such as the MD5 Message-Digest Algorithm to generate an encrypted hash value.

Figure 15:
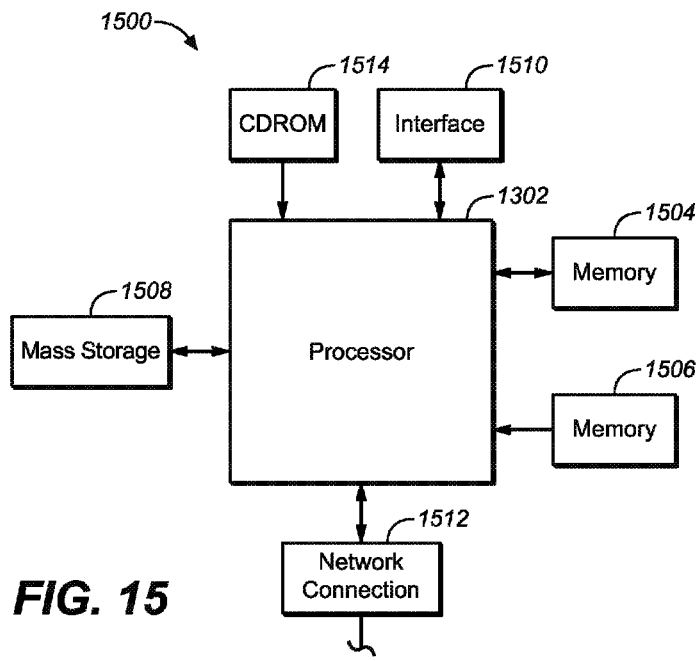
FIG. 15 shows a diagrammatic block diagram representation generally showing a computer system that can be used to implement some or all of the functionality of a CAD and other tools described above.

FIG. 15 shows a diagrammatic block diagram representation generally showing a computer system that can be used to implement some or all of the functionality of a CAD and other tools described above. The computer system 1500 includes any number of processors 1502 (also referred to as central processing units, or CPUs) that are coupled to devices including memory 1504 (typically a random access memory, or "RAM"), memory 1506 (typically a read only memory, or "ROM"). The processors 1502 can be configured to generate an electronic design. As is well known in the art, memory 1506 acts to transfer data and instructions uni-directionally to the CPU and memory 1504 is used typically to transfer data and instructions in a bi-directional manner.

Both of these memory devices may include any suitable type of the computer-readable media described above. A mass storage device 1508 is also coupled bi-directionally to CPU 1502 and provides additional data storage capacity and may include any of the computer-readable media described above. The mass storage device 1508 may be used to store programs, data and the like and is typically a secondary storage medium such as a hard disk that is slower than memory. The mass storage device 1508 can be used to hold a library or database of prepackaged logic or intellectual property functions, as well as information on generating particular configurations. It will be appreciated that the information retained within the mass storage device 1508, may, in appropriate cases, be incorporated in standard fashion as part of memory 1504 as virtual memory. A specific mass storage device such as a CD-ROM 1514 may also pass data uni-directionally to the CPU.

CPU 1502 also is coupled to one or more interfaces 1510 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. The CPU 1502 may be a design tool processor. Finally, CPU 1502 optionally may be coupled to a computer or telecommunications network using a network connection as shown generally at 1512. With such a network connection, it is contemplated that the CPU 1502 might receive information from the network, or might output information to the network in the course of performing the above-described process steps. It should be noted that the system 1500 might also be associated with devices for transferring completed designs onto a programmable chip. The above-described devices and materials will be familiar to those of skill in the computer hardware and software arts.

Although many of the components and processes are described above in the singular for convenience, it will be appreciated by one of skill in the art that multiple components and repeated processes also can be used to practice the techniques of this disclosure. While particular embodiments have been particularly shown and described with reference to specific implementations thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. Additionally, certain steps in one or more of the processes above may be omitted, performed multiple times, performed in parallel, and performed in different orders. It is therefore intended that the invention be interpreted to include all variations and equivalents that fall within the true spirit and scope of the present invention.

What is claimed is:

1. A method comprising:
generating, by one or more computer systems, a hardware description language (HDL) implementation of a circuit design to be implemented on a programmable logic device (PLD);
partitioning, by the one or more computer systems, the circuit design into a first portion and a second portion, the first portion including an interface for coupling the first portion and the second portion;
generating, by the one or more computer systems, a first programming file based on the HDL implementation that contains first configuration programming bits for only the first portion and that contains default programming bits for the second portion;
generating, by the one or more computer systems, a second programming file based on the HDL implementation that contains second configuration programming bits for only the second portion and that contains default programming bits for the first portion;
verifying, or providing to a third-party certification body for verification, at least the second configuration programming bits;
revising the first portion;
generating revised first configuration programming bits for the revised first portion;
merging the revised first configuration programming bits for the revised first portion with the verified second configuration programming bits for the second portion; and
providing the merged configuration programming bits for programming into a PLD.

2. The method of claim 1, wherein the second portion is a safety-critical portion that includes functions that require certification by an independent certification body as meeting functional safety requirements.

3. The method of claim 1, further comprising analyzing the HDL implementation to generate a hierarchical implementation of the circuit design, wherein partitioning the circuit design into the first portion and the second portion is performed at the hierarchical representation level.

4. The method of claim 1, further comprising generating an exclusion list of resources to be reserved for the second portion.

5. The method of claim 1, wherein the revised first configuration programming bits are included as part of a third programming file that contains the revised first configuration programming bits for only the revised first portion and that contains default programming bits for the second portion.

6. The method of claim 5, further comprising generating a bit mask that includes a first set of bits each having a first logical value and a second set of bits each having a second logical value, each of the first set of bits being in a location of the bitmask that corresponds to a programming bit in the second or the third programming file that is used by the second portion.

7. The method of claim 6, wherein merging the revised first configuration programming bits for the revised first portion with the second configuration programming bits for the second portion comprises merging the third programming file with the second programming file using the bitmask to generate a merged programming file.

8. The method of claim 7, wherein when a CAD tool operates on the second programming file with the bitmask, the tool is enabled to extract the second configuration programming bits for the second portion from the second programming file.

9. The method of claim 6, further comprising using the bitmask to verify that the second configuration programming bits for the second portion have not been altered in the merged programming file.

10. A programmable logic device (PLD) formed by the process comprising:
 generating a hardware description language (HDL) implementation of a circuit design to be implemented on a programmable logic device (PLD) device;
 partitioning the circuit design into a first portion and a second portion, the first portion including an interface for coupling the first portion and the second portion;
 generating a first programming file based on the HDL implementation that contains first configuration programming bits for only the first portion and that contains default programming bits for the second portion;
 generating a second programming file based on the HDL implementation that contains second configuration programming bits for only the second portion and that contains default programming bits for the first portion;
 verifying, or providing to a third-party certification body for verification, at least the second configuration programming bits;
 revising the first portion;
 generating revised first configuration programming bits for the revised first portion;
 merging the revised first configuration programming bits for the revised first portion with the verified second configuration programming bits for the second portion; and
 providing the merged configuration programming bits for programming into the PLD.

11. The PLD of claim 10, wherein the second portion is a safety-critical portion that includes functions that require certification by an independent certification body as meeting functional safety requirements.

12. The PLD of claim 10, wherein the process further comprises analyzing the HDL implementation to generate a hierarchical implementation of the circuit design, wherein partitioning the circuit design into the first portion and the second portion is performed at the hierarchical representation level.

13. The PLD of claim 10, wherein the process further comprises generating an exclusion list of resources to be reserved for the second portion.

14. The PLD of claim 10, wherein the revised first configuration programming bits are included as part of a third programming file that contains the revised first configuration programming bits for only the revised first portion and that contains default programming bits for the second portion.

15. The PLD of claim 14, wherein the process further comprises generating a bit mask that includes a first set of bits each having a first logical value and a second set of bits each having a second logical value, each of the first set of bits being in a location of the bitmask that corresponds to a programming bit in the second or the third programming file that is used by the second portion.

16. The PLD of claim 15, wherein merging the revised first configuration programming bits for the revised first portion with the second configuration programming bits for the second portion comprises merging the third programming file with the second programming file using the bitmask to generate a merged programming file.

17. The PLD of claim 15, wherein the process further comprises using the bitmask to verify that the second configuration programming bits for the second portion have not been altered in the merged programming file.

* * * * *